UNITED STATES PATENT OFFICE.

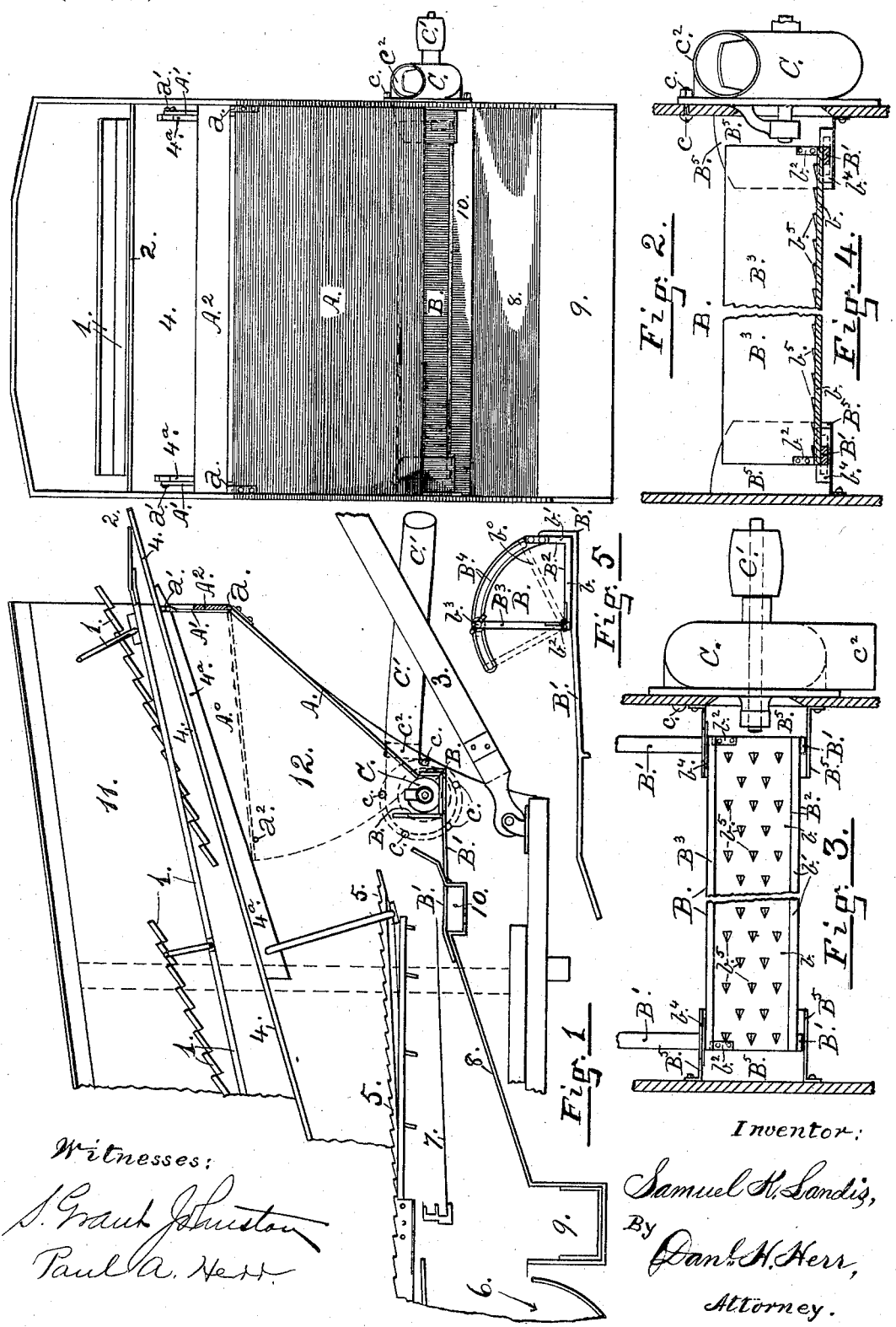

SAMUEL K. LANDIS, OF MOUNT JOY, PENNSYLVANIA.

CHAFF ASSEMBLER AND CONVEYER.

SPECIFICATION forming part of Letters Patent No. 641,022, dated January 9, 1900.

Application filed May 13, 1897. Serial No. 636,298. (No model.)

*To all whom it may concern:*

Be it known that I, SAMUEL K. LANDIS, a citizen of the United States, residing at Mount Joy, in the county of Lancaster and State of Pennsylvania, have invented certain new and useful Improvements in Chaff Assemblers and Conveyers; and I do hereby declare the following to be a full, clear, and exact description of the invention, such as will enable others skilled in the art to which it appertains to make and use the same.

This invention relates to improvements in separating grain-threshers, and particularly to that class of separators using automatic stackers, swinging endless belt, or tubular blast to convey the straw and chaff intermingling therefrom.

The object of the invention is to provide such separators with means to prevent the chaff from intermingling with the straw and to convey said chaff separately to a storage-place for independent use, being a very useful feature, since chaff is now much in vogue in preparing mixed or mashed feed.

The elements of the invention will severally and at large appear in the following description and will be separately and collectively set forth in the claims.

The purposes of the invention are attained by the mechanism and devices illustrated in the accompanying drawings, similar reference characters designating like parts throughout the several views, in which—

Figure 1 is a side elevation of the rearward end portion of such a separator with the near side of the casing removed, showing the elements of the invention in position. Fig. 2 is a view from the right of Fig. 1, completed, with the chaff-conveying tube and the stacker removed; and Figs. 3, 4, and 5 are detached and enlarged views showing the elements of the invention in detail and combination as they appear in Figs. 1 and 2 with portions removed for want of room in the drawings.

First will be considered the parts of the separator in question which form no part of the invention, but to which its elements are applied and in connection with which they are used, reference being had to Figs. 1 and 2 of the drawings, in which the numeral 1 indicates the straw-rack receiving the straw from the cylinder and carrying it rearwardly over the end 2 onto the stacker 3, a portion of which only is shown for want of room in the drawings. This straw-rack shakes back and forth in a manner well known to the trade, separating the grain and chaff together from the straw in its rearward passage over said rack, and by reason of said shaking the solid slide or inclined plane 4, having strengthening-ribs $4^a$ on its under side, receiving them, and down which slide they move over the lower end thereof onto the chaffer 5, where in being exposed to the air-blast from the fan-chamber 6 the chaff is separated from the wheat or other grain and blown out through the rearward end, intermingling again with the straw on the stacker, carried away therewith, and lost to independent or separate use, while the grain falls onto the riddle 7 and therethrough onto the inclined plane 8, down which it rolls into the grain-receptacle 9, the riddle 7 carrying the coarser particles or unthreshed heads, known as "tailings," into a receptacle 10, from which they may be removed and threshed again, said inclined plane 4 forming in the rearward portion of the casing two separate compartments—namely, a straw-passage 11 above and a chaff-passage 12 below. Now it is the purpose of this invention to prevent the chaff at this stage from being again intermingled with the straw and carried away therewith, but to gather or assemble and carry it away to a separate storage chamber or place for independent use, as before mentioned, and to this end the following instrumentalities are introduced:

In the rear end of the casing, in the chaff passage-way thereof, is arranged a swinging trap or door A, having the ends of its upper edge, as by hinges $a$, hinged or pivoted to the lower ends of hangers A', having their upper ends rigidly secured, as by rivets or screws $a'$, to the rearward ends of the strengthening-ribs $4^a$, which are rigidly secured to the under side of the solid inclined plane or slide 4 used in separators of this class. In their lower portions, from the hinge-joints $a$ a prescribed distance upward, these hangers also support, rigidly secured thereto, a board or strip $A^2$, partially closing the space above the trap, as shown, leaving an opening, however, for the egress of air, preventing its choking or packing rearward of the fan, while the trap in the inclined position shown closes the rearward end of the chaff-passage and forms a chute to conduct the chaff into a trough, yet to be described, and on top of the rearward side wall of which its lower end rests. It is adapted to be folded up against the inclined-plane strengthening-ribs $4^a$, as indicated by the dotted lines $A^0$, and secured in place, as by a pin $a^2$, passed into the sides of the casing when the trap is not needed for the assembling of chaff, leaving the passage-way open for its free escape.

Rearward of the tailings-receptacle 10, before mentioned, is arranged a chaff gathering or receiving box or trough B, securely affixed in any approved manner onto the rearward ends of bracket-arms B', having their forward ends extended across said tailings-receptacle, as shown, and securely affixed in any approved manner to the body of the inclined plane 8, also before mentioned. The box or trough B, of the required size, preferably consists of an L-shaped portion $B^2$ and a swinging or folding portion $B^3$. The former, comprising the bottom $b$ and the rearward side wall $b'$, rigidly secured together along their adjacent edges, preferably rests on top of and against the rearward ends of the bracket-arms, as shown, being rigidly secured thereto by any approved means—such as bolts or screws passed therethrough, but not shown in the drawings—and the latter or folding portion $B^3$, constituting the forward side wall of the trough, has its lower edge pivoted or hinged to the forward edge of the bottom by hinges $b^2$ at the ends thereof, and which portion by reason of said hinges may be folded either way, as indicated by dotted lines. A slotted circularly-curved arm $B^4$, having one end secured to one end of the rearward side wall $b'$, as shown, with a pin or stud passing through the slot and projecting from the adjacent end of the forward or swinging side wall, and having a thumb-nut $b^3$ screwed home thereon, serves to adjust the latter wall, holding it in any inclined position. The wall $b'$ on its upper edge also serves to support the lower end of the trap-door A in its inclined position, constituting a chaff-assembling chamber, and when it occupies the dotted position $A^0$ the wall $B^3$ may be folded onto said upper edge, as indicated by the dotted lines $b^0$, covering the trough. The trough B should be placed in position a prescribed distance rearward from the tailings-receptacle 10, so as to leave sufficient space between them for refuse matter that is not chaff to fall through should any pass over the tailings-board or drop from the rear end of the chaffer. Since the parts 7, 8, 9, and 10, constituting the riddle-rack, to the rear end of which the box B is attached, all shake or have motion crosswise of the casing, said box B must be somewhat shorter than is the width of said casing to permit said motion, and in order that chaff may not fall from the ends of said box or trough guard plates or shields $B^5$, embracing the bottom and both sides of said ends, are rigidly secured to the inner faces of the casing. In the forward upright walls of the shields are slots or openings through which the arms B' are permitted the required motion, and plates $b^4$, moving with the arms, are placed thereon and adapted to cover said openings, keeping them closed. Within the trough, on the upper face of its bottom, are arranged triangular ridges $b^5$, all rising or upwardly sloping toward that end from which the chaff has its exit, their slopes aiding its progress in this direction and their abrupt highest points offering obstructions to its retrogression.

Adjacent to the trough end through which the chaff is to be taken the side wall of the casing is provided with an aperture, opening to the outside, into which is fitted the eye or inlet of any approved exhaust-fan or blower C, rigidly secured in place by bolts and nuts $c$, being driven by means of an endless belt on its pulley $c'$, said belt being set in motion by the cylinder of the machine. (Not shown in the drawings.) Onto the outlet-nozzle $c^2$ of the blower is securely affixed in any approved manner one end of any suitable tubing C', such as of canvas, of any required length and having the other end in the desired place to which the chaff is to be conveyed for storage.

Now an inspection of the drawings clearly shows, first, that the trap A, inclined as shown, and the board $A^2$ practically close the rear end of the casing against the escaping of the chaff in this direction, the open space above the latter, $A^2$, preventing the air from packing or choking and the former, A, forming a slope or chute conducting the chaff into the box or trough B; second, that the box or trough B will receive the chaff from said chute, and by reason of the crosswise shaking before mentioned, together with the arrangement of the projections $b^5$ on its bottom, said chaff will tend toward the exit end and therethrough into the eye or inlet of the blower, and, third, that the blower C by reason of the suction through said eye will draw the chaff thereinto and through the outlet-nozzle into the tubing C', forcing it through said tubing to the desired storage-place.

Having now described the invention and fully ascertained and set forth the manner in which its functions are performed, what is considered new, and desired to be secured by Letters Patent, is—

1. In a separating-thresher having a straw-passage, a chaff-passage, and a chaffer in the rearward portion of its casing, and a sidewise-shaking riddle-rack with a grain-chute and a tailings-receptacle at its rear end in the lower portion thereof, as shown, a chaff assembler and conveyer comprising: rearwardly-projecting bracket-arms extending over the top of said tailings-receptacle with their forward ends secured to the top of said grain-chute, an open-ended chaff-trough secured onto the rearward ends of said bracket-arms, an upwardly-foldable door having its lower end edge resting on the rearward side wall of said trough and its upper end edge hinged to the lower ends of hangers depending from the top of the chaff-passage, a board partially closing the space above the upper end of said door and secured to the rearward faces of said hangers, there being an orifice cut through a side of the casing and opening into one end of said trough, an exhaust-fan with its inlet-eye fitted into said orifice and its outlet-nozzle rearwardly projecting with its base rigidly secured to the outer face of said casing, and a tubular conductor having one end secured onto the outlet-nozzle of said fan, all substantially as described and for the purpose hereinbefore set forth.

2. In a separating-thresher having the straw passage-way, 11, and the chaff passage-way, 12, in the rearward portion of its casing as shown, and a blast from the fan-chamber, 6, to separate the chaff from the grain and carry it through said chaff passage-way, in combination, a chamber as described in the rearward end of said chaff passage-way to receive the separated chaff, a trough as described arranged within said chamber to collect the chaff and convey it to the outlet part thereof, an exhaust-fan arranged to take the chaff from said outlet part, and a flexible tube with one end secured to the outlet-nozzle of said fan, all substantially as described and for the purpose hereinbefore set forth.

In testimony whereof I affix my signature in presence of two witnesses.

SAMUEL K. LANDIS.

Witnesses:
HARVEY B. LUTZ,
DANIEL H. HERR.